United States Patent [19]

Fauteux

[11] Patent Number: 5,275,092
[45] Date of Patent: Jan. 4, 1994

[54] CARROUSEL BASKET FOR A COOKING APPARATUS

[76] Inventor: Lucien Fauteux, 24 Somerville Avenue, Montreal, Quebec, Canada, H3Z 1J2

[21] Appl. No.: 15,975

[22] Filed: Feb. 10, 1993

[30] Foreign Application Priority Data

Feb. 14, 1992 [CA] Canada .................. 2061248

[51] Int. Cl.$^5$ .................................... A47J 37/12
[52] U.S. Cl. ............................. 99/407; 99/336; 99/409; 99/411; 99/416; 220/525
[58] Field of Search ............ 99/334–336, 355, 403, 407–409, 410–418, 427, 447, 448, 450; 210/464–469, 477; 126/369; 134/159; 219/400; 221/150A, 150HC, 150R, 82, 299; 222/146.1, 146.2; 220/428, 525

[56] References Cited

U.S. PATENT DOCUMENTS

| | | |
|---|---|---|
| 629,320 | 7/1899 | Ball .................. 126/369 |
| 757,186 | 4/1904 | Fancher . |
| 940,557 | 11/1909 | Roe . |
| 1,310,495 | 7/1919 | Ford .................. 99/336 |
| 1,316,827 | 9/1919 | Brunner .............. 99/416 X |
| 1,343,738 | 6/1920 | Nelson .............. 99/336 X |
| 1,472,205 | 10/1923 | Brunner .............. 99/411 |
| 1,630,787 | 5/1927 | Cullen .............. 99/416 |
| 2,267,640 | 12/1941 | DeWitt .............. 220/525 |
| 2,510,866 | 6/1950 | Currier, Jr. . |
| 2,522,152 | 9/1950 | Wilson .............. 99/416 X |
| 2,762,674 | 9/1956 | Sauvago .............. 220/525 |
| 2,773,442 | 12/1956 | Contreras . |
| 3,022,722 | 2/1962 | Arvan . |
| 3,036,513 | 5/1962 | Reeves . |
| 3,068,912 | 12/1962 | Shaw . |
| 3,237,804 | 3/1966 | Bardy et al. . |
| 3,274,920 | 2/1966 | Benson . |
| 3,279,353 | 10/1966 | Shelor .............. 99/407 |
| 3,291,035 | 12/1966 | Ignelzi . |
| 3,347,152 | 10/1967 | Congelli et al. . |
| 3,354,813 | 11/1967 | Meyer . |
| 3,357,341 | 12/1967 | Kocken . |
| 3,448,677 | 6/1969 | Dexters . |
| 3,468,354 | 9/1969 | Reachert . |
| 3,614,924 | 8/1969 | Hickey . |
| 3,645,196 | 2/1972 | Johnston et al. . |
| 3,667,373 | 6/1972 | Sicher et al. . |
| 3,690,247 | 9/1972 | Van Cleven et al. . |
| 3,896,715 | 7/1975 | Mascret . |
| 4,022,693 | 5/1977 | Morgan, Jr. .......... 210/477 |
| 4,155,294 | 5/1979 | Langhammer et al. . |
| 4,295,419 | 10/1981 | Janghammer . |
| 4,437,395 | 3/1984 | Speaker . |
| 4,526,689 | 7/1985 | Morgan .............. 210/477 |
| 4,646,628 | 3/1987 | Lederman .......... 99/413 |
| 4,991,737 | 2/1991 | Edelman .......... 220/525 |

FOREIGN PATENT DOCUMENTS

| | | |
|---|---|---|
| 958242 | 11/1974 | Canada . |
| 1302103 | 6/1992 | Canada . |
| 1261308 | 4/1961 | France . |
| 485307 | 5/1938 | United Kingdom . |
| 988592 | 4/1965 | United Kingdom . |
| 2215312 | 9/1989 | United Kingdom ......... 220/525 |

Primary Examiner—Timothy F. Simone
Attorney, Agent, or Firm—Ronald S. Kosie; Robert Brouillette

[57] ABSTRACT

The present invention relates to a basket assembly for an apparatus for cooking and dispensing hot food products. The assembly may be incorporated into a vending machine to prepare fast food products such as (fried) fish, french fried potatoes, potato chips, chicken fingers, pasta, etc. The assembly includes carrousel container means and cover means for covering the carrousel container means. The carrousel container means is provided with integral receptacle members for receiving (measured portions of a) food product; the carrousel container means can rotate with respect to the cover means in merry-go-round fashion about a vertical axis. The food product is held by the receptacle members and is progressively cooked in a hot liquid such as water or oil. Once food product is cooked, the assembly is raised and food product is discharged from a receptacle member through the upper opening of the receptacle member. The upper opening is aligned with a chute opening in the cover means, the upper openings of the other receptacle members being blocked by the cover means.

19 Claims, 5 Drawing Sheets

CARROUSEL BASKET FOR A COOKING APPARATUS

FIELD OF THE INVENTION

The present invention relates to a basket assembly for an apparatus for cooking and dispensing food product. The assembly may be used in conjunction with a vending machine to prepare fast food products such as fried fish, french fried potatoes, potato chips, chicken fingers, pasta, etc.

DESCRIPTION OF PRIOR ART

Various types of devices have been proposed for preparing hot food products such as fried fish, french fried potatoes, potato chips, chicken fingers, etc. Known devices have a number of drawbacks which preclude their general use. Some devices, for example, are adapted to provide food product continuously in regular succession; this is not practical in cases where demand is irregularly or when continuous conveyor type production is not desired. In others cases the known devices may be too expensive to operate or too expensive to manufacture. The time taken in order to cook a food product with known devices may also be too long to be of practical value for machines such as single serving automatic vending machines.

U.S. Pat. No. 3,896,715 and Canadian Pat. No. 958,242 to Mascret, for example, describe an apparatus for cooking and distributing measured quantities (e.g. single servings) of hot food product. The device taught includes a rectangular tank for containing the hot cooking liquid (e.g. cooking oil) and a perforated basket. The device is also provided with a supply means for storing and delivering food product to be cooked as well as a dispensing station wherein cooked food is received in container format for distribution to a consumer. The basket is provided with food pockets which hold the food product in the cooking liquid during the cooking process. The walls of the food holding pockets, however, are defined by a non-moving element (i.e. the peripheral side wall) and an element housed in the interior of the non-moving element, the interior element being movable relative to the non-moving element. The moving element comprises a plurality of radially extending blade walls which are rotatable, ferris wheel fashion, about a horizontal axis defined by a spindle. The means for imparting motion of the food pockets comprises an abutment which is designed to enter an elongated slit in the cylindrical side wall of the basket so as to urge the interior movable element to rotate in the basket and thus define a series of rotating food pockets.

The known system shown in the above mentioned patent has a drawback. Since food product can at the same time contact a moving part (e.g. a blade wall) and a non-moving part, food product can become trapped or pinched between the two parts; as a result food product can be crushed thereby. Such mashing of the food product can lead to clogging of the moveable parts of the basket, an unsightly mashed product as well as the undesirable introduction of food particles into the heating liquid. Any of these consequences can impede the operation of the device and accelerate the need to clean the basket and/or to clean or replace the heating liquid; either of these results can add undesirably to the maintenance/operating cost of the device.

This known system has another drawback also related to the movable part of the food pocket. Since the movable part is housed within the interior of a non-rotating part it can be difficult to obtain adequate alignment between the movable partition walls defining the food pocket and the discharge chute opening; if such alignment is inadequate, not all of the cooked product may be discharged by gravity from the food pocket. Any undischarged food product will of course be re-cooked (i.e. burnt) and be discharged on a further discharge cycle leading to an end product containing undesirable overcooked material.

It would be advantageous to have a means for providing a hot food product either continuously or on an intermittent basis with a minimum of attention.

It would also be advantageous to have a means for the quality production of food product.

It would further be advantageous to have an apparatus which is capable of handling different types of food products.

It would additionally be advantageous to have a means facilitating alignment of the chute with the food pocket(s) of the cooking basket so as to facilitate discharge of cooked food product.

It would as well be advantageous to have a simple basket assembly for a cooking apparatus which can be used or installed in a vending machine as well as in any other type of food preparation and dispensing apparatus.

It would further be advantageous to have a deep cooking fat frying well or equivalent cooking basin which can be advantageously used with a basket assembly for the preparation of hot food product.

SUMMARY OF THE INVENTION

The present invention generally relates to a basket assembly for an apparatus for cooking or preparing a food product. The basket assembly is provided with a carrousel container means (having perforated walls) which is rotatable about a vertical axis, i.e. the carrousel container means can rotate in merry-go-round fashion. In accordance with the present invention, food product is placed in an integral receptacle member (or food pocket) i.e. the body defining the food pocket is integral and as such does not include elements which move relative to one another during rotation. During rotation, the entire carrousel container means including all of the receptacle members, is on the move as a unit. Accordingly, as can be appreciated, this means that the food product is not susceptible to being pinched between moving elements and therefore the creation of mashed food product can be avoided. In accordance with the present invention, the words "integral", "integral unit" or the like, unless indicated to the contrary, shall thus be understood as characterizing the expression "receptacle member" or any similar or analogous expression as being a body which does not include elements which move relative to one another during rotation.

Thus, the present invention generally provides, a basket assembly for an apparatus for cooking food product in a hot cooking liquid,
said basket assembly comprising
carrousel container means,
cover means for covering said carrousel container means,
said cover means having a top side and an opposite bottom side, the bottom side being adjacent the carrousel container means
and means for rotatably mounting said carrousel container means to said cover means such that said carrousel container means is rotatable, with respect to said cover plate means, about a vertical axis.

The carrousel container means comprises a plurality of perforated receptacle members for releasably holding food product; the receptacle members hold food product during immersion of food product in the hot cooking liquid. Each receptacle member is an integral unit. The receptacle members are disposed radially about the vertical axis and are each provided with an upper opening for the introduction of food product to the interior thereof and for the removal of food product therefrom. The cover means has a chute opening means; the chute opening means includes a cover opening and a chute communicating with the cover opening, the chute being disposed on the top side of the cover means. The cover means and the carrousel container means are configured such that, for the introduction of food product to the interior of a receptacle member and for the removal of food product therefrom, the upper opening of each receptacle member is alignable, by rotation of the carrousel container means about the vertical axis, with the cover opening, non-aligned upper openings being blocked by the cover plate means.

In accordance with the present invention, the carrousel container means may comprise a tubular member which is closed at the bottom and open at the top. The carrousel container member may also have a plurality of spaced partitioning wall members for partitioning the interior of the tubular member. The tubular member may comprise bottom wall means and side wall means with the partitioning wall members extending radially about the vertical axis and being fixed to each other along the axial edges thereof, to the bottom wall means and to the side wall means; it is to be understood herein that the axial edges are the edges of the partitioning wall members adjacent the vertical axis. In this case, a receptacle member is defined by a pair of adjacent partitioning wall members and respective portions of the bottom wall means and the side wall means; the upper opening of a receptacle is defined by the upper edges of the adjacent partitioning wall members and the portion of the side wall means disposed therebetween. Preferably the partition wall members are configured as flat plates.

In accordance with the present invention the side wall means of the tubular member may have a circular cross-section.

In accordance with the present invention, the receptacle members preferably are of equal size.

In accordance with the present invention the means for rotatably mounting said carrousel container means may take any aspect which allows for rotation of the carrousel container means about its vertical axis. The edges of the cover means may have mono-rail like side supports engaging the side edges of the carrousel container means for rotational motion. The means for rotatably mounting the carrousel container means to said cover means may, for example, in particular, include
a spindle shaft,
said spindle shaft being fixed to the carrousel container means, the longitudinal axis of the spindal shaft being coincident with said vertical axis,
and
a sleeve opening
said sleeve opening extending through said cover means,
said sleeve opening rotatably engaging a portion of the spindle shaft,
and wherein an exposed end portion of the spindle shaft extends out of the sleeve opening on the top side of the cover means.

In accordance with the present invention the basket assembly may include releasable lock means for releasably locking an upper opening in alignment with said cover opening. The lock means may for example, include
an outwardly extending peripheral flange,
said flange being disposed about the top of the tubular member, said flange being provided with a plurality of spaced alignment apertures for engaging a lock pin, each of said alignment apertures being associated with the aligned position of a respective receptacle member.

The lock means may additionally include
a lock pin aperture defined by said cover means and
lock pin means (e.g. solenoid lock pin means) including a retractable lock pin, said lock pin means being fixed to the cover means such that the lock pin thereof can be retractably extended through the lock pin aperture and lockingly engage an alignment aperture corresponding to the aligned position for a respective aligned receptacle member.

An apparatus incorporating the basket assembly of the present invention may include a displacement (e.g. tilting) mechanism for immersing and withdrawing the basket assembly from a tank containing hot cooking liquid (e.g. water, oil, fat or the like). The displacement mechanism may, for example, have a pivot arm, the pivot arm being fixed to the cover means of the basket assembly.

Thus, in accordance with another aspect, the present invention provides an apparatus for cooking and dispensing hot food product, the apparatus comprising
a hot product dispensing station,
reservoir means for hot cooking liquid,
a basket assembly,
said basket assembly comprising
carrousel container means,
cover means for covering said carrousel container means,
said cover means having a top side and an opposite bottom side, the bottom side being adjacent the carrousel container means,
and
means for rotatably mounting said carrousel container means to said cover means such that said carrousel container means is rotatable, with respect to said cover means, about a vertical axis,
said carrousel container means comprising a plurality of perforated receptacle members for releaseably holding food product, said receptacle members being disposed radially about said axis, each said receptacle member being an integral unit and having an upper opening for the introduction of food product to the interior thereof and for the removal of food product therefrom,
said cover means having chute opening means for guiding food product to and from a said upper opening,
said chute opening means having a cover opening and a chute communicating with said cover opening, said chute being disposed on the top side of said cover means, said cover means and said carrousel container means being configured such that the upper opening of a receptacle member is alignable, by rotation of the carrousel container means, with the cover opening, for the introduction of food product to the interior thereof and for the removal of food product therefrom, the upper openings of non-aligned receptacle members being blocked by the cover means displacement means
for displacing said basket assembly between an immersion position wherein food product within said receptacle members is immersed in said cooking liquid and a product discharge position wherein said receptacle members are withdrawn from said cooking liquid and hot product is dischargeable to said dispensing station from the upper opening of a receptacle aligned with said cover opening, supply means
for supplying fresh food product to the chute opening means for delivery to a receptacle member, the upper opening thereof being aligned with said cover opening, and rotation means
for rotating said carousel container means about said vertical axis.

In accordance with the present invention, the food product may, for example, be delivered to a receptacle member when the basket assembly is in the immersion position or depending on the supply means used at a position before the immersion position.

In accordance with the present invention, the basket assembly for an above described apparatus, may include releasable lock means for releasably locking an upper opening in alignment with said cover opening, as mentioned above. The lock means may, for example, particularly include an outwardly extending peripheral flange,
said flange being disposed about the top of the tubular member, said flange being provided with a plurality of spaced alignment apertures for engaging a lock pin, each of said alignment apertures being associated with the aligned position of a respective receptacle member, a lock pin aperture defined by said cover means and
solenoid lock pin means including a retractable lock pin, said solenoid lock pin means being fixed to the cover means such that the lock pin thereof can be retractably extended through the lock pin aperture and engage an alignment aperture corresponding to the aligned position for a respective aligned respectacle member.

In accordance with the present invention food product may be dischargeable by gravity when the basket assembly is in said discharge position and the displacement means may include
a pivot shaft (e.g. defining a horizontal axis), and
pivot arm means,
said pivot shaft being spaced apart from the basket assembly,
said pivot arm means being fixed to the pivot shaft and to the cover means,
said displacement means being configured such that said displacement means pivots said basket assembly about said pivot shaft from the immersion position to said discharge position and pivots said basket assembly about said pivot shaft from said discharge position to said immersion position.

In accordance with the present invention the pivot shaft may for example be operatively connected to a reversible motor means or assembly for effecting displacement of the basket assembly between the immersion and discharge positions.

In accordance with the present invention the rotation means may include a flexible drive shaft, one end of the flexible drive shaft being operatively connected to a motor and the other end thereof being fixed to the exposed end of the spindle shaft such that the tubular member is thereby rotatably mounted to the cover plate means. The flexible drive shaft should be so disposed and be of sufficient length so as not to inhibit the displacement of the basket assembly between the immersion and discharge positions. The rotation mechanism may of course take any other aspect provided that the necessary carrousel rotation may be achieved; for example, rim teeth may be disposed about the carrousel for engagement with a correspondingly formed gear means which is driven directly by a motor or through a flexible drive shaft.

In accordance with the present invention the reservoir means may include a basin member having a closed bottom, an open top for receiving the carrousel container means and side wall means, said side wall means of said basin member having a circular cross-section.

In accordance with the present invention the apparatus may include electric heater means in the form of a helical coil disposed in the basin member adjacent to and spaced apart from the side wall means of said basin member such that for the immersion position the coil is disposed between the tubular member and said side wall means of the basin member, the coil being spaced apart from the tubular member.

Supply means for supplying food product may take any suitable form; it may be automatic. It may, for example, if french fries are to be made, take the form of the feed mechanism shown in U.S. Pat. No. 3,896,715.

In accordance with the present invention, the dispensing station can take on any suitable (known) form; see for example U.S. Pat. No. 3,986,715.

An apparatus incorporating the basket assembly of the present invention may, if desired, include means for automatically coordinating the activity(ies) of each of the member elements thereof. Automatic control means may comprise suitable conventional mechanisms for activating and controlling the various member elements; such means are known in the art and will thus not be particularly described herein. Control means may, for example, comprise any suitable timer control mechanisms for controlling, in a timed, cooking cycle sequence, the amount of frozen food product to be added to a receptacle member, the cooking time (i.e. the time food product is immersed in cooking liquid), the start and duration of food product discharge, the start and duration of immersion time, the activation/deactivation of the motor inducing rotation of the carrousel container means and, if desired, the start and duration of basket vibration to shake off free cooking liquid.

In accordance with the present invention, for example, the supply means, the rotation means for rotating the carrousel container means and the basket assembly displacement means may be controlled by any suitable coordinating control mechanism such that in the immersion position, fresh product is introduced into the receptacle member aligned with the chute opening means.

The carrousel rotation means then rotates the carrousel container means in merry-go-round fashion to replace the receptacle member containing fresh product with a receptacle containing cooked product, the basket assembly at this point being tilted to the discharge position for discharge of hot product. The carrousel rotation, may, however, if desired occur at a position intermediate between the immersion and discharge positions before discharge of cooked product.

A device in accordance with the present invention may be incorporated into a vending machine wherein the initial food product is in frozen form (e.g. frozen french fries), the hot product being dispensed to a the customer in a relatively short period of time since the product is progressively cooked as it rotates merry-go-round fashion.

The various parts of the basket assembly and apparatus incorporating it, may be made of any material suitable for use in cooking a food product, (e.g. stainless steel or the like); it should be kept in mind, however, that the physical characteristics of the various elements must be such as to allow the elements to adequately function in the cooking environment.

DESCRIPTION OF THE DRAWINGS

An example embodiment of the invention is illustrated in the drawings wherein.

A particular example embodiment of the invention will hereinafter be described in more detail with reference to the figures.

Figure 2:
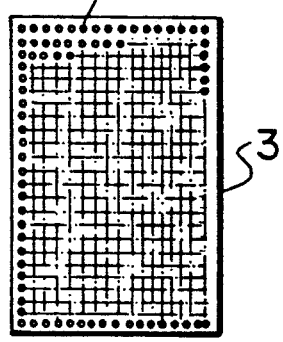
FIG. 2 is side view of a partitioning member of the carrousel container means illustrated in FIG. 1.
Figure 3:
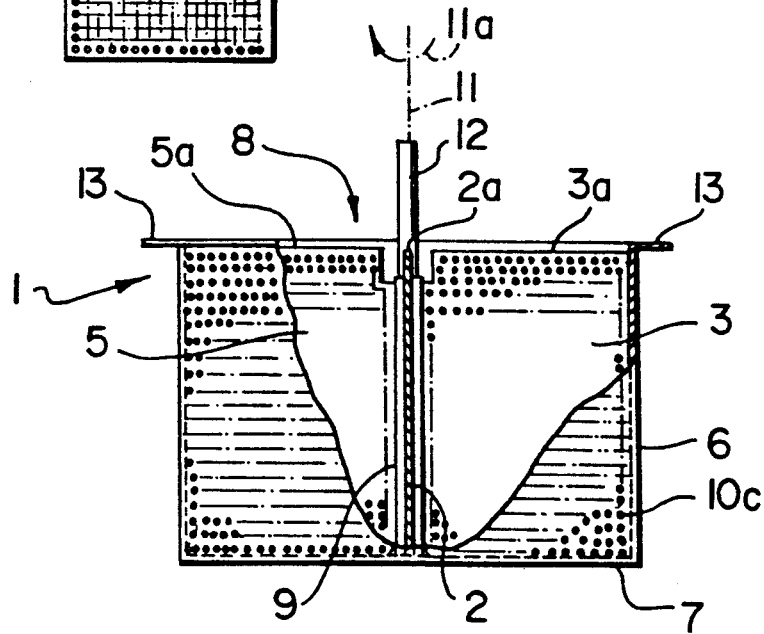
FIG. 3 is a side view of the carrousel container means of FIG. 1, viewed in the direction of the eye shown in FIG. 1 and with the side wall partially cut away to show the interior.

FIG. 2 and 3 illustrate a carrousel container means in accordance with the present invention. The carrousel container means has a tubular member (i.e. hollow member) indicated generally by the reference number and four (4) partitioning wall members 2, 3, 4 and 5 which are disposed in the interior of the tubular member 1. Although only four partitioning wall members are shown for the illustrated embodiment, the number of partitioning wall members may be varied as desired, provided that corresponding modifications are made to the configuration of the chute opening means to take this into account.

The tubular member 1 has a cylindrical configuration. It has as circular side wall 6 and a bottom wall 7; the side wall 6 has a circular cross section. The tubular member 1 is also open at the top as indicated generally by the reference number 8 (see FIG. 3).

Figure 1:
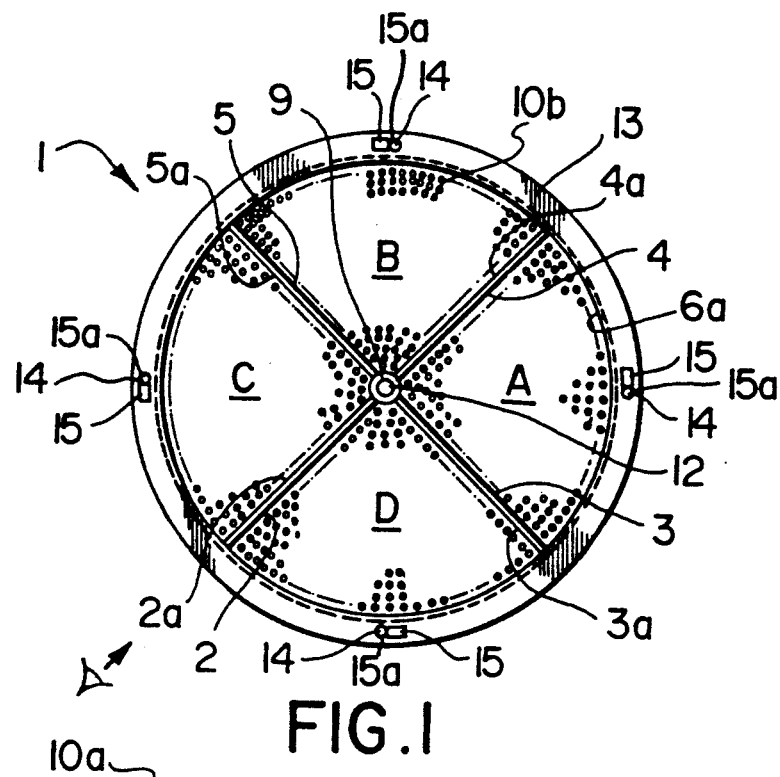
FIG. 1 is a top view of a carrousel container means of the present invention.

The partitioning wall members 2, 3, 4, and 5 are configured as identical flat rectangular plates; FIG. 2 shows a side view of the partitioning wall member 3 which is identical to the other wall members. The wall members 2, 3, 4 and 5 are fixed to each other as well as to the side wall 6 and the bottom wall 7. The wall members 2, 3, 4 and 5 may be fixed to each other either directly or indirectly. In FIGS. 1 and 3 the wall members 2, 3, 4 and 5 are shown as being indirectly fixed to each other, along their axial edges, by being fixed to the rod 9 which has a circular cross section; the rod 9 could of course have a different cross section e.g. a square cross section. The partitioning wall members may be fixed to the each other and to the other elements of the tubular member in any suitable manner, e.g. by welding, by nut/bolt arrangements etc.

The carrousel container means thus has four (4) integral receptacle members A, B, C and D. Each receptacle member is defined by a respective pair of adjacent partitioning wall members and respective portions of the bottom and side walls; receptacle member A, for example, is defined by adjacent partitioning wall members 3 and 4 as well as corresponding portions of the side wall 6 and the bottom wall 7. The upper opening of each of the receptacle members A, B, C and D is defined by upper edges 2a, 3a, 4a and 5a of the partitioning members as well as a corresponding portion of the upper edge of the side wall 6; for example the upper opening of the receptacle member A is defined by upper edge 3a and 4a as well as side wall edge portion 6a.

The rod 9 is disposed such that its longitudinal axis is coterminous or coincident with the vertical axis 11 (see FIG. 3). The partitioning wall members 2, 3, 4 and 5 extend radially about the axis 11, i.e. they extend radially from the rod 9 to the side wall 6. The cylindrical volume of the tubular member 1 is thereby divided into four equal segments. As can be seen each of the receptacle members thus comprises about 25% of the (hollow) cylindrical volume of the tubular member 1 and are disposed around the axis 11, i.e. each receptacle member is disposed radially about the axis whereby rotation of the carrousel container means about the axis 11, in the direction of the arrow 11a, causes the volume of each receptacle member to orbit about the axis 11, i.e. in a circular path. Although the receptacle members are shown in FIGS. 1 and 3 as having a more or less wedge shape volume, the receptacle members may take on other aspects which may for example provide circular volumes, square volumes, etc.. Additionally the side walls of the receptacles members may be separate from the side walls of adjacent receptacle members, i.e. the receptacle members need not share common partitioning walls as in the case of the example embodiment illustrated herein.

The side wall 6, the bottom wall 7 and each of the partitioning means 2, 3, 4 and 5 are provided with perforations (i.e. openings) a number of which are indicated generally by the references numbers 10a, 10b and 10c respectively. The size of the perforations is dictated by the size of food product it is intended to be cooked in any particular carrousel container means; the perforations are sized so as to allow the cooking liquid to pass into the interior of the carrousel container means while yet being small enough to hold the food product therein.

The carrousel container means also has a spindle shaft 12 which is fixed to the rod 9; the spindle shaft 12 also has a circular cross-section. The spindle shaft 12 is used to rotatably mount the carrousel container means to the cover means as shall be explained below.

The tubular member is provided with an outwardly extending peripheral flange 13. The flange 13 is provided with four alignment apertures designated by the common reference number 14. The apertures 14 are configured so as to cooperate with a lock pin; the lock pin is designated in FIGS. 10 and 10b by the reference number 34 and is connected to the cover means for locking the carrousel container means in a position wherein an upper opening of a receptacle member is aligned with a cover opening (as shall be discussed below). Each of the alignment apertures 14 is associated with the alignment position of an associated receptacle member. For the embodiment illustrated herein, the alignment aperture 14 adjacent the receptacle member C is the aperture associated with the alignment position of receptacle member A; the aperture adjacent the receptacle member D is the aperture associated with alignment position of receptacle member B; and so on for the alignment positions for receptacle members C and D. The alignment apertures may of course be differently disposed about the flange 13 as long as the apertures are associated with the alignment position of a respective receptacle member.

As mentioned above, the carrousel container means may be rotated in merry-go-round fashion for displacing the receptacle members about the vertical axis 11 so that each receptacle member in turn is brought into alignment with the chute opening; this rotational movement may be stopped in any suitable fashion including by direct control of the motor means inducing the rotation. In the embodiment shown, however, the flange 13 is provided with lock pin stop members (indicated by the common number 15) to assist or facilitate engagement of the lock pin (34) in an alignment aperture 14 and to assist or facilitate stoppage of the merry-go-round rotation of the carrousel container means.

Each of the stop members 15 has an abutment surface 15a (see FIG. 10b for a more detailed side view) which is in line with the inner surface of the aperture 14. The stop members 15, however, are disposed adjacent respective alignment apertures 14 so that on rotation, the apertures 14 travel in front of the stop members 15 with respect to the lock pin (34). Thus, during carrousel rotation, in the direction of the arrow, the lock pin may be made to travel over the surface of the flange 13 such that the lock pin initially tends to pass over the aperture 14; however, the lock pin will engage the abutment surface 15a, which engagement inhibits further carrousel rotation, and then be guided by the abutment surface 15a for engagement with the respective alignment aperture 14. This locking-stop effect will be described again in relation to FIGS. 10 and 10a.

Figure 4:
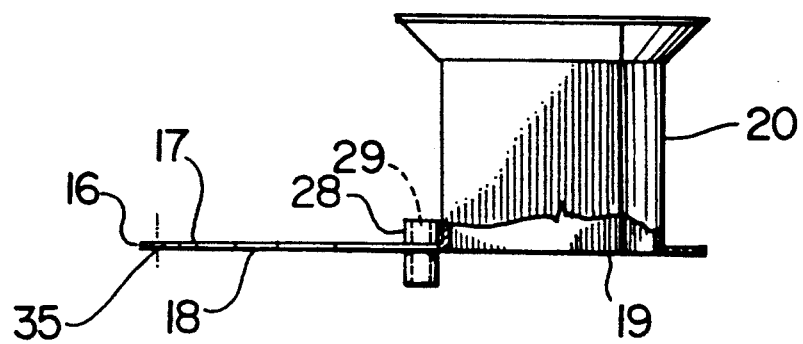
FIG. 4 is a side view of a cover means for the carrousel container means shown in FIG. 1 with a portion cut away to expose the cover opening.
Figure 5:
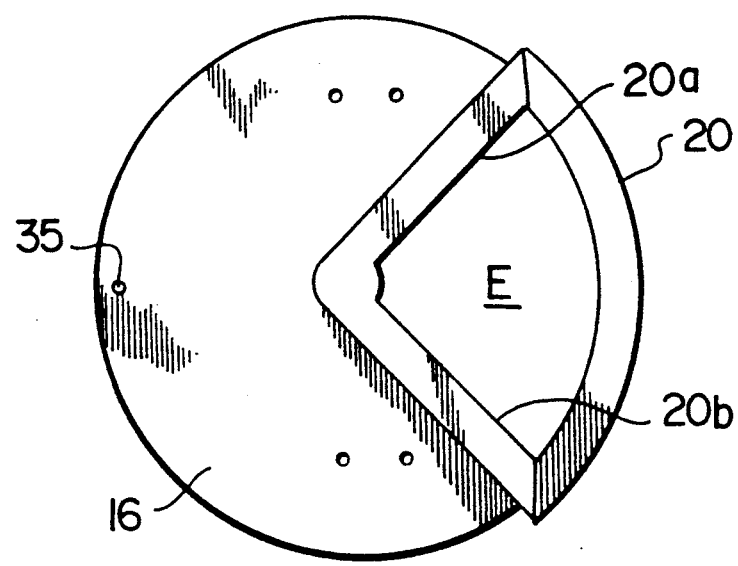
FIG. 5 is a top view of the cover means shown in FIG. 4.

FIGS. 4 and 5 illustrate a cover means in accordance with the present invention for covering the open top of the tubular member 1. The cover means comprises a circular plate 16 sized to cover the top of the tubular member 1 shown in FIGS. 1 and 3. The plate 16 has an upper or top side 17 which is opposite a bottom side 18, the bottom side 18 being adapted to be adjacent the carrousel container means (see FIG. 10). The plate 16 also has a cover opening 19 and a guide chute 20.

Figure 6:
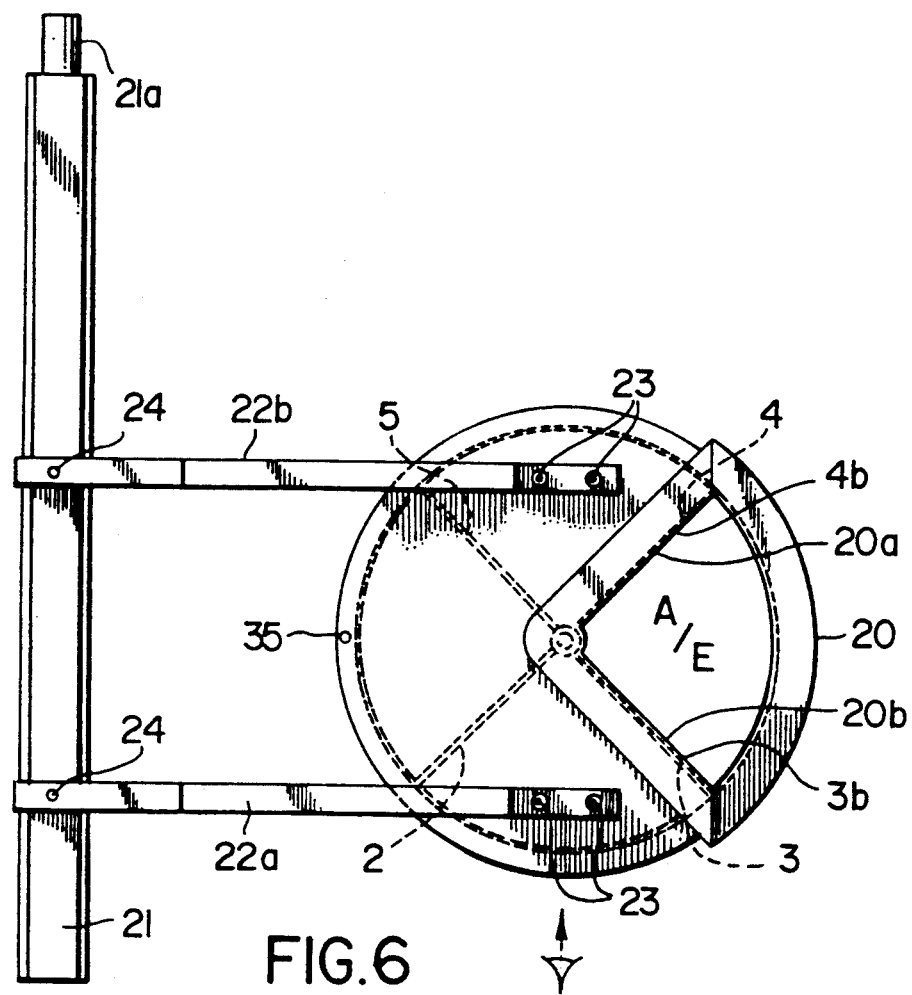
FIG. 6 is a top view of a basket assembly having a tilting element fixed thereto, the basket assembly incorporating the carrousel container means and the cover means shown in FIGS. 1 and 4.

The guide chute 20 and the cover opening 19 define a guide passageway E having the same cross sectional configuration as the receptacle members 2, 3, 4 and 5 of the tubular member 1. The passageway E is shown in FIG. 6, by way of example, in an aligned position, namely a position wherein the upper opening of the receptacle member A is aligned with the cover opening 19. As can be seen from FIG. 6, in the aligned position, the surfaces 3a and 4a of the partitioning wall members 3 and 4 line up with the surfaces 20a and 20b of the guide chute 20; such lining up facilitates the discharge of food product from the receptacle member. Thus, the words "align", "alignment" or the like are to be herein understood to characterize the configuration of the upper openings and the cover opening as being such, that an upper opening and the cover opening can be aligned such that, when viewed from above, as in FIG. 6, the upper opening can be confined within the limits set by the cover opening, the other upper openings being blocked by the cover means (e.g. cover plate).

Referring to FIGS. 6 to 10 the basket assembly may be associated with a pivot shaft 21 and pivot arm means comprising two spaced pivot arms 22a and 22b. The pivot arms 22a and 22b are fixed at one end thereof to the cover plate 16 and at the other end thereof to the pivot shaft 21 by nut/bolt arrangements indicated by the common reference numbers 23 and 24 respectively. The pivot arms 22a and 22b space the pivot shaft 21 from the basket assembly such that pivot rotation of the pivot shaft can (as shall be described below) displace the basket assembly between an immersion position and a discharge (i.e. tilt) position.

Figures 7, 8:
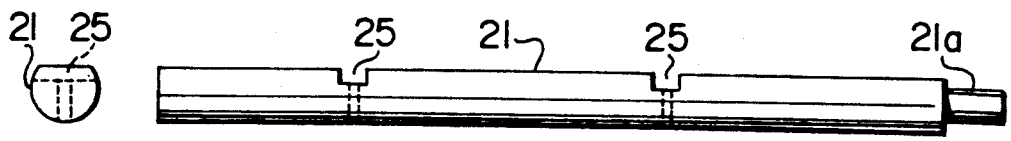
FIG. 7 is side view of a pivot shaft of the tilting element shown in FIG. 6.
FIG. 8 is an end view of the pivot shaft shown in FIG. 7.

As seen from FIGS. 7 and 8 the pivot shaft 21 has a semi-circle like cross section and is provided with slots designated by common reference number 25 for seating the ends of the pivot arms associated therewith. The base of the slots 25 has an opening which passes through the shaft 21 for receiving a bolt or the like. The shaft 21 also has an end 21a which has a reduced diameter for mounting to a motor actuating means such as a pulley-motor assembly; attachment of the end 21a being accomplished in any suitable (known) manner for the fixation of a shaft for rotation to a motor (e.g. set screw clamp, etc.).

Figure 9:
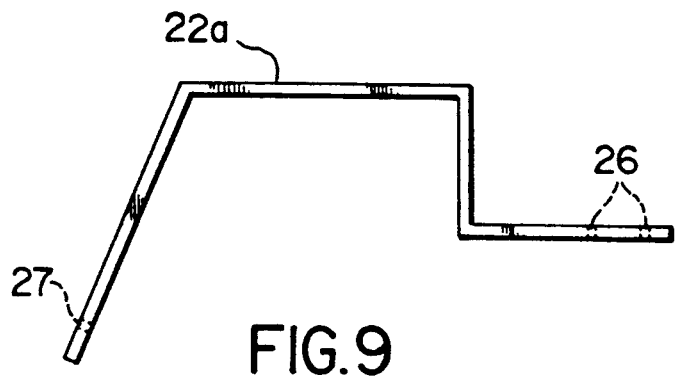
FIG. 9 is a side view of a pivot arm seen in FIG. 8.

Referring to FIG. 9 the pivot arms likewise are provided with openings 26 and 27 for receiving a bolt or the like of a bolt/nut combination. The cover plate 16 is also provided with corresponding holes to receive the bolt etc. Other types of fixation means (e.g. welding) may, if desired, be used to fix the pivot shaft, pivot arms and cover plate together.

Figure 10B:
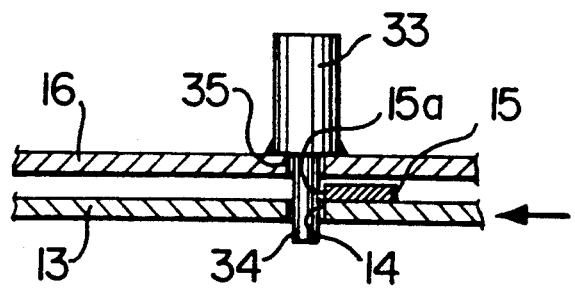
FIG. 10b is a partial sectional side view of an alignment aperture and lock pin mechanism of the basket assembly illustrated in FIG. 10 with the lock pin engaged in an alignment aperture.
Figure 10:
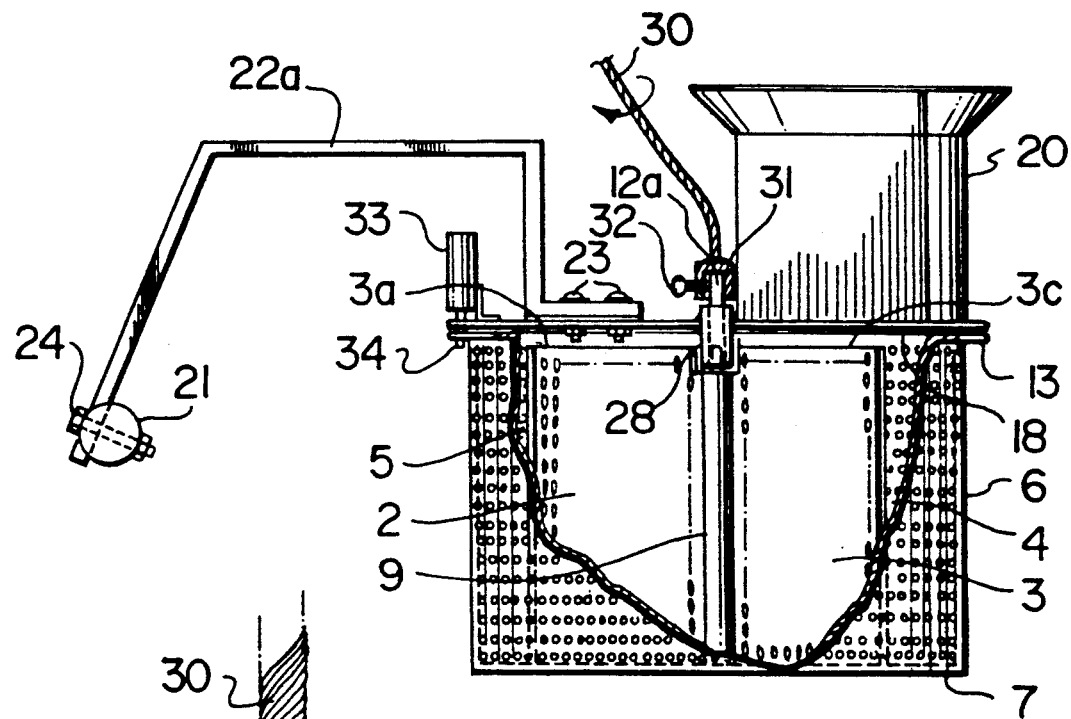
FIG. 10 is a side view of the basket assembly as shown in FIG. 6 viewed in the direction of the eye shown therein, the side wall being partially cut away to expose the interior of the carrousel container means.

Referring to FIGS. 4 and 10, the plate 16 has a sleeve 28 which is fixed to the plate 16 (e.g. welded thereto) and defines a sleeve opening 29. The sleeve opening 29 is configured to rotatably embrace the spindle shaft 12 such that an end portion 12a of the spindle shaft 12 extends out of the sleeve opening 29 on the top side 17 of the plate 16. The sleeve 28 may, if desired, be omitted, the sleeve opening in such case being defined by the plate 16 itself. The bottom side 18 of the plate 16 is, as seen from FIG. 10, adjacent the carrousel container means.

Figure 10A:
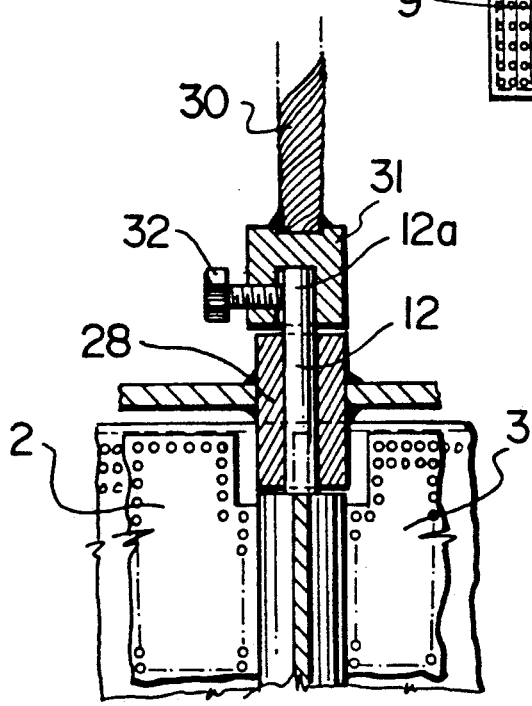
FIG. 10a is a detail partial sectional side view of the means for rotatably mounting the carrousel container means to the cover plate.

Referring to FIGS. 10 and 10a, the basket assembly is associated with a flexible drive shaft 30 which is operatively connected at one end thereof to a drive motor (not shown); the motor is connected to the shaft 30 such that the motor can rotate the shaft 30 so as to induce rotation of the carrousel container means. Flexible drive shafts suitable for the purposes herein are known such as, for example, stock drives from Designatronics. Although it is not shown, the drive shaft 30 is disposed and is of sufficient length such that it does not inhibit tilt motion of the basket assembly.

The flexible drive shaft 30 also has a connector element 31 at the other end thereof which comprises an enlarged body having an opening therein. The opening of the connector element 31 is sized so as to allow for sufficient clearance so that the end 12a of the spindle shaft 12 can be slipped therein. The connector element 31 is fixed to the shaft by a clamp or set screw (or bolt) 32; turning the set screw 32 to tighten it against the end portion 12a causes the end portion 12a to be securely pinched or clamped up against the connector element 31 and thus to the flexible drive shaft. In the embodiment illustrated herein, it is this connection mechanism which rotatably mounts the carrousel container means to the cover plate 16; the connector element 31 being larger then the diameter of the sleeve opening, the connector element 31 can thus rotatingly abut the sleeve 28 such that the carrousel container means and the cover plate 16 cannot be separated unless the set screw 32 is loosened to release the hold on the end 12a (of the spindle shaft 12). The mounting is such that the carrousel container means may be rotated, as desired, in a clockwise or anti-clockwise direction when viewed from above; in the embodiment illustrated, the rotation is, for the purposes of illustration, clockwise.

Alternatively, if desired, a shallow groove may be provided on the end 12a of the shaft 12 for mating engagement with a C-clip, the C-clip being sized larger than the sleeve opening 29 such that the C-clip rotatingly mounts (i.e. supports) the carrousel container means; the C-clip will abut the upper part of the sleeve 28 in place of the connector element 31. In this case the flexible drive shaft is used solely to induce rotation of the carrousel container means.

Referring to FIGS. 6, 10 and 10b, as mentioned above, a retractable lock pin 34 is provided for engagement with the alignment apertures 14 so as to lock the carrousel container means into an alignment configuration(s) wherein the upper opening of one receptacle member at a time, is aligned with the cover opening 16 while the upper openings of the other receptacle members are blocked by the cover plate 16. The retraction and extension of the lock pin 34 into an alignment aperture may be accomplished by any suitable means keeping in mind the need to align an upper opening with the cover opening 19. The displacement of the lock pin 34 may, for example, be induced by solenoid means. The solenoid means may remotely induce locking and unlocking of the carrousel container means by operatively connecting the lock pin 14 to the solenoid means, by a length of push/pull cable; alternatively, as shown in FIGS. 10 and 10a, solenoid means 33 may be directly fixed to the cove plate 16.

The solenoid means 33 may be fixed to the cover plate 16 in any suitable fashion (e.g. bolt/nut combination—not shown) and is itself activated/deactivated in known manner using suitable (known) control devices (not shown); the solenoid means is operated so as to cooperate with the means for inducing carrousel rotation.

The solenoid means includes a solenoid and a bias spring (not shown). The bias spring is connected to the lock pin 14 so as to bias the lock pin in a non extended position (a non-locking position); activation of the solenoid acts against this bias, forcing the lock pin 14 into an extended locking position for locking the carrousel container means in an alignment position. The cover plate 16 (see FIG. 4, 5 and 6) also has an aperture 35; locking is effected by disposing the lock pin 14 in the aperture 35 and also engaging the lock pin 34 with an alignment opening 14 (see FIG. 10b). Thus, as long as the lock pin 34 extends through the aperture 35 and engages an opening 14 the carrousel container means cannot rotate with respect to the cover plate 16.

When it is necessary to rotate the carrousel container means, the solenoid is electrically deactivated such that the natural bias of the spring withdraws the lock pin 34 clear of the aperture opening 14. The lock pin means is also sufficiently withdrawn to initially clear the adjacent stop member 15. Thereafter, the solenoid is activated so that the lock pin 14 is disposed to slide over the surface of the flange 13 such that the lock pin 34 may come into abutting contact with the abutment surface 15a of the next following stop member 15 whereupon the solenoid urges the lock pin 34 into engagement with the respective aperture 14.

Figure 11:
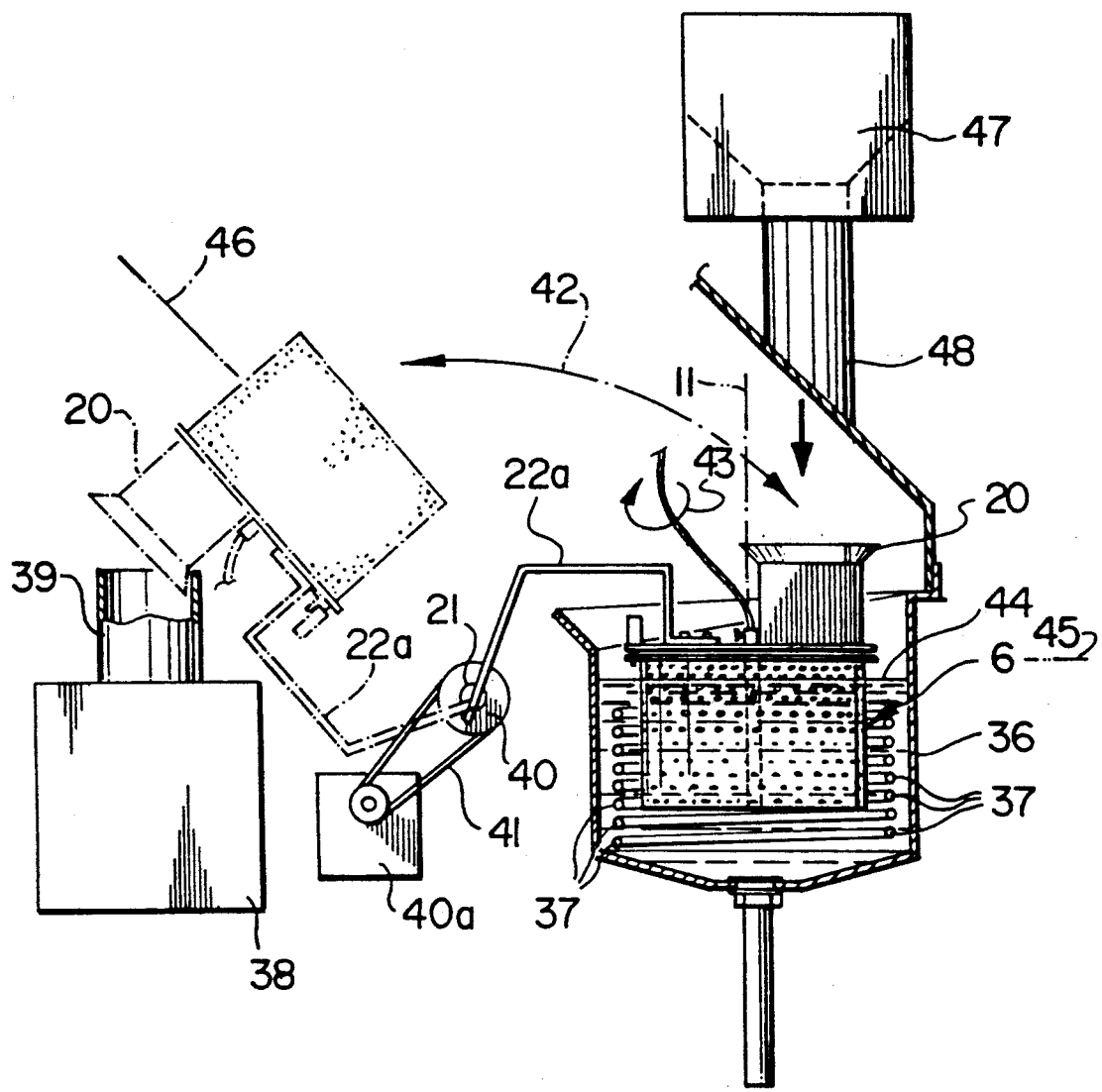
FIG. 11 is schematic of an apparatus incorporating basket assembly as shown in FIGS. 6 and 10.

Turning to FIG. 11, this figure schematically illustrates an apparatus in accordance with the present invention which incorporates the basket assembly as shown in FIGS. 1 to 10.

The apparatus shown in FIG. 11 includes a cylindrical cooking basin 36 in which is operatively disposed a helically configured electrical heating element; the various turns of the heating element are generally designated by the common number 37 (only some of the turns are so designated). As can be seen the electrical heater is disposed between the side wall of the basin 36 and the side wall 6 of the tubular member of the carrousel container means. This type of cylindrical cooking basin arrangement is preferred since it gives rise to certain advantages over more conventional arrangements.

For example, an Incaloy tubular heating element (such as from Chromal10x U.S.) 0.315" in diameter and 236" long may be coiled in 8 rows to fit in a cylindrical basin 11" in diameter to provide an 8" frying zone. The total wattage of the heating element may be 6700 watts, such that the watt density is 29.75 watts per square inch of heating element surface. The heating element may be immersed in 10 liters of cooking oil. This configuration of basin and heating element in a minimum of cooking liquid provides a relatively high efficiency in preheat and recovery time. The preheat time from room temperature to 183° C. for such an arrangement can be 7.5 minutes whereas the temperature during peak frying operation can be between 175° C. and 193° C.

By comparison, a conventional electric fryer (open vat type) uses a rectangular shaped tank with the heating elements concentrated together in the bottom of the tank. The total wattage of the heating element may be 10,500 watts. Such a configuration necessitates a relatively high watt density (e.g. 40 watts per square inch) as well as a larger cooking oil volume. The preheat time for such an arrangement can be 14.25 minutes with a temperature for peak operation ranging between 150° C. and 195° C.

Thus, the cylindrical cooking basin configuration which is possible in accordance with the present invention, can provide food product with a relatively reduced energy consumption; exploit a lower watt density so as to reduce oil scorching (i.e. oil can be used longer); provide a relatively easy to clean basin (i.e. reduce or eliminate hard to clean squared corners); etc.

Returning to FIG. 11, a dispensing station 38 is also provided for taking up the food product discharged from a receptacle element; the station being provided with a hopper funnel 39 cooperating with the passageway E of the guide chute 20 to direct the food product to the desired location for immediate or delayed distribution to a consumer(s). The dispensing station as mentioned above can take on any suitable (known) form; see for example U.S. Pat. No. 3,986,715.

The apparatus shown in FIG. 11, is further provided with a drive motor/pulley assembly for the rotation of the pivot shaft for inducing a tilting displacement of the basket assembly between an immersion position wherein food product in the receptacle members is immersed in hot cooking liquid (e.g. water, oil, fat, etc.) in basin 36 and a discharge position wherein the chute 20 is adjacent the hopper 39. Such motor/pulley assemblies are known and as such will not be described herein in detail. The end 21a of the pivot shaft 21 is fixed in any suitable manner to a pulley 40, the pulley itself being fixed relative to the basin 36 and being operatively connected to the drive motor 40a (not specifically shown) by pulley belt 41. In FIG. 11 for purposes of illustration only the basket assembly is shown in both the immersion position and the discharge position, displacement between these positions being noted by the arrow 42; the basket assembly is shown in dotted outline in the discharge position. The rotation of the flexible drive shaft 30 in the direction designated by the arrow 43 induces the carrousel container means to rotate about its axis 11; the rotation of the shaft 30 is of course induced by the motor connected thereto (not shown).

Thus, operation of the apparatus shown in FIG. 11, embodying a basket assembly in accordance with the present invention, exploits two types of motion, namely, rotation of the carrousel container means about its vertical axis and displacement of the basket assembly between the immersion and discharge positions about a horizontal axis (i.e. the axis coterminous with the longitudinal axis of the shaft 21).

For the apparatus shown in FIG. 11, at the commencement of a cooking cycle, the basket assembly is in the immersion position when food product in the receptacle members is immersed in cooking liquid (e.g. oil), the level of the cooking liquid being denoted by the reference number 44. Thus, for the immersion position not all of each receptacle member need be immersed in the cooking liquid, i.e. only that part which is necessary in order to assure immersion of the food product.

In the immersion position the carrousel container means can, if desired, be rotated about the vertical axis 11 in merry-go-round fashion in the cooking liquid (e.g. oil) for changing the receptacle member that is aligned with the chute opening (means). The carrousel container means may, alternatively, if so desired, be rotated about its vertical axis 11 with the basket assembly being in some intermediate displacement position between the immersion and discharge positions; however, in this case the tilt angle of the basket assembly with respect to the horizontal (plane) must not be such that gravity discharge (i.e. sliding) of food product could occur so as to allow food product to undesirably spill out before reaching the final discharge position.

As can be seen from FIG. 11, the minimum tilt angle for discharge to occur is an angle (on pivot rotation of the basket assembly) which is greater than about 90 degrees from the immersion position; the discharge tilt angle may for example vary from any and all (ranges) of angles between from about 90 degrees to about 180 degrees relative to the immersion position, e.g. any angle from between about 110 to about 145 degrees; the larger the tilt angle the greater the tendency of the product to gravity discharge.

As illustrated in FIG. 11 the discharge tilt angle is the angle defined between planes which are at right angles to the plane of the paper on which FIG. 11 is disposed; these planes appear in FIG. 11 as lines 45 and 46 respectively, plane 45 being that of the immersion position. If desired, rather than using a discharge position as shown in FIG. 11, the discharge position may be such that the basket assembly is disposed more or less upside down relative to the immersion position, i.e. to facilitate complete discharge of food product.

FIG. 11 shows a food product supply member 47 and an associated feed hopper 48; these elements can be of any suitable known type.

The operation of an apparatus in accordance with the present invention will now be described in relation to the apparatus shown in FIG. 11. The use of the basket assembly will be described in relation to a conveyor type process for the preparation of food product; single servings can of course be prepared in analogous fashion. The food product may, for example, be frozen french fries and the cooking liquid an oil suitable for cooking french fries.

As mentioned above at the commencement of the cooking cycle the basket assembly is in the immersion position, the cooking liquid being at a sufficient temperature to cook the food product, and the receptacle members are empty. The carrousel container means is locked by the lock pin 34 such that the upper opening of receptacle member A is aligned with the cover opening 19 (as described above). The food product supply means 47 is activated to deliver a predetermined quantity of food product to the feed hopper 48 which directs the food product to the chute opening means for guidance to the interior of the receptacle member A. The food product in receptacle A is allowed to cook for 15 to 30 seconds. The lock pin means is then withdrawn from engagement with the aperture 14, sufficiently to initially clear the adjacent stop member 15 and thereafter is disposed to ride on or just above the surface of the flange 13 (with minimum clearance) so that the lock pin 34 may come to into abutting contact with the abutment surface 15a of the next following stop member 15. The drive motor of the flexible drive shaft 30 is also activated after the desired cooking time so that the flexible drive shaft 30 rotates in the direction of the arrow 43 an amount sufficient to induce rotation of the unlocked carrousel container means about the vertical axis of the carrousel container means, (i.e. clockwise rotation when viewed from above). Carrousel rotation is sufficient so as to align the upper opening of receptacle member B with the cover opening 19, the lock pin 34 stopping rotation by abutting contact with the respective abutment surface 15a. The lock pin 34 at this point is forced into engagement with the alignment aperture associated with the receptacle B, namely the alignment opening 14 adjacent the receptacle member D. The drive motor for the pivot shaft 21 is activated to displace the basket assembly from the immersion position to the discharge position for discharge of food product during start up receptacle B is of course empty so no food product will tumble out of receptacle member B into the hopper funnel 39. The drive motor for the pivot shaft 21 is then reversed to displace the basket assembly from the discharge position back to the immersion position and the receptacle member B is provided with food product as in the case for the receptacle member A. The cycle is repeated so as to fill the other receptacle members C and D after which the apparatus cyclically produces hot food product from each of the receptacle members in turn.

Preferably, the apparatus in FIG. 11 includes shaking or vibration means whereby the basket assembly is stopped for a few seconds at a position intermediate the immersion and discharge positions to shake off excess cooking liquid for return to the cooking basin 36. The vibration may, for example, be induced by an electrically driven vibrator or similar vibrator means operatively connected to the pivot shaft 21.

As mentioned above, the rotation mechanism for rotating the carrousel container relative to the cover means may take on any other suitable configuration provided that the necessary rotation of the carrousel container can be achieved. Thus, alternatively, for example, the outwardly extending flange 13 (see FIGS. 1 and 3) may be constructed so as to have a periphery having a plurality of notches or openings extending thereabout. These notches or openings may be configured to mate and cooperate with the peripheral teeth of a gear wheel so as to be able to induce rotation of the carrousel container. The gear wheel may be disposed such that the teeth thereof are in essentially the same plane as the notches of the flange 13 or at an angle thereto such as for example, at a right angle. The gear wheel may be fixed to a gear shaft which is rotatably seated in a gear casing or cowling member. The gear casing or cowling is fixed in any suitable manner to the cover plate 16 (see FIGS. 4, 5 and 6). The cover plate 16 may, for example, include a tongue-like projection adjacent to the hole 35, the tongue extending outwardly from the periphery thereof toward the shaft 21; the gear casing member may be fixed to the underside of the tongue-like projection. The gear casing may include usual means (e.g. bearings, bushings and the like) for rotatable embracing the gear shaft, i.e. so that the gear shaft is rotatable about its longitudinal axis. With the gear shaft rotatably mounted in the gear casing, opposite ends of the gear shaft project therefrom, one such end being fixed to the gear wheel and the opposite other end being fixed to the flexible drive shaft 30. This alternate rotation mechanism operates in a manner the same as or analogous to the mechanism shown in FIGS. 10 to 11.

The invention has been described with particular reference to an example embodiment; however, it is to be understood that the embodiments of the invention may take other forms without departing from the scope and spirit of the invention.

The embodiments of the invention in which an exclusive property or privilege is claimed are defined as follows:

1. A basket assembly for an apparatus for cooking food product in a hot cooking liquid,
said basket assembly comprising
carrousel container means,
cover means for covering said carrousel container means,
said cover means having a top side and an opposite bottom side, the bottom side being adjacent the carrousel container means,
means for rotatably mounting said carousel container means to said cover means such that said carrousel container means is rotatable, with respect to said cover means, about a vertical axis,
said carrousel container means comprising a plurality of perforated receptacle members for releasably holding food product, said receptacle members being disposed radially about said axis, each said receptacle member being an integral unit and having an upper opening for the introduction of food product to the interior thereof and for the removal of food product therefrom,
said cover means having chute opening means for guiding food product to and from a said upper opening,
said chute opening means having a cover opening and a chute communicating with said cover opening, said chute being disposed on the top side of said cover means,
said cover means on the top side of said cover means, said cover means and said carrousel container means being configured such that the upper opening of a receptacle member is alignable, by rotation of the carrousel container means about said vertical axis, with the cover opening, for the introduction of food product to the interior thereof and for the removal of food product therefrom, the upper openings of non-aligned receptacle members being blocked by the cover means.

2. An assembly as defined in claim 1 wherein said carrousel container means comprises a tubular member and a plurality of spaced partitioning wall members for partitioning the interior of the tubular member, said tubular member being closed at the bottom and open at the top, said tubular member comprising bottom wall means and side wall means, said partitioning members each having an axial edge, said partitioning members extending radially about the vertical axis and being fixed to each other along the axial edges thereof, to said bottom wall means and to said side wall means, each receptacle member being defined by a pair of adjacent partitioning wall members and respective portions of the bottom wall means and the side wall means, the upper opening of a receptacle member being defined by the upper edges of the adjacent partitioning walls and the portion of the side wall means disposed therebetween.

3. An assembly as defined in claim 2 wherein the side wall means of said tubular member has a circular cross-section.

4. An assembly as defined in claim 3 wherein said receptacle members are of equal size.

5. An assembly as defined in claim 2 wherein said means for rotatably mounting said carrousel container means to said cover plate means includes
a spindle shaft,
said spindle shaft being fixed to the carrousel container means, the longitudinal axis of the spindal shaft being coincident with said vertical axis,
and a sleeve opening
  said sleeve opening extending through said cover plate means, said sleeve opening rotatably engaging a portion of the spindle shaft,
and wherein an end portion of the spindle shaft extends out of the sleeve opening on the top side of the cover plate.

6. An assembly as defined in claim 5 wherein said basket assembly includes releasable lock means for releasably locking a receptacle in alignment with said chute opening means.

7. An apparatus for cooking and dispensing hot food product, the apparatus comprising
a hot product dispensing station,
reservoir means for hot cooking liquid,
a basket assembly,
said basket assembly comprising
  carrousel container means,
  cover means for covering said carrousel container means,
    said cover means having a top side and an opposite bottom side, the bottom side being adjacent the carrousel container means,
  and
    means for rotatably mounting said carrousel container means to said cover means such that said carrousel container means is rotatable, with respect to said cover means, about a vertical axis,
  said carrousel container means comprising a plurality of perforated receptacle members for releaseably holding food product, said receptacle members being disposed radially about said axis, each said receptacle member being an integral unit and having an upper opening for the introduction of food product to the interior thereof and for the removal of food product therefrom,
  said cover means having chute opening means for guiding food product to and from a said upper opening,
    said chute opening means having a cover opening and a chute communicating with said cover opening,
    said chute being disposed on the top side of said cover means,
  said cover means and said carrousel container means being configured such that the upper opening of a receptacle member is alignable, by rotation of the carrousel container means, with the cover opening for the introduction of food product to the interior thereof and for the removal of food product therefrom, the upper openings of non-aligned receptacle members being blocked by the cover means
displacement means
  for displacing said basket assembly between an immersion position wherein food product within said receptacle members is immersed in said cooking liquid and a product discharge position wherein said receptacle members are withdrawn from said cooking liquid and hot product is dischargeable to said dispensing station from the upper opening of a receptacle aligned with said cover opening,
supply means
  for supplying fresh food product to the chute opening means for delivery to a receptacle member, the upper opening thereof being aligned with said cover opening,
and rotation means
  for rotating said carousel container means about said vertical axis.

8. An apparatus as defined in claim 7 wherein said carrousel container means comprises a tubular member and a plurality of spaced perforated partitioning wall members for partitioning the interior of the tubular member, said tubular member having a closed bottom and an open top, said tubular member comprising perforated bottom wall means and perforated side wall means, said partitioning members each having an axial edge, said partitioning members extending radially about the vertical axis and being fixed to each other along the axial edges thereof, to said bottom wall means and to said side wall means, each receptacle member being defined by a pair of adjacent partitioning wall members and respective portions of the bottom wall means and the side wall means, the upper opening of a receptacle member being defined by the upper edges of the adjacent partitioning walls and the portion of the side wall means disposed therebetween.

9. An apparatus as defined in claim 8 wherein the side wall means of said tubular member has a circular cross-section.

10. An apparatus according to claim 9 wherein said receptacle members are of equal size.

11. An apparatus as defined in claim 8 wherein said means for rotatably mounting said carrousel container means to said cover means includes
a spindle shaft,
  said spindle shaft being fixed to the carrousel container means, the longitudinal axis of the spindal shaft being coincident with said vertical axis,
and
a sleeve opening
  said sleeve opening extending through said cover means, said sleeve opening rotatably engaging a portion of the spindle shaft,
an exposed end portion of the spindle shaft extending out of the sleeve opening on the top side of the cover means.

12. An apparatus as defined in claim wherein said basket assembly includes releasable lock means for releasably locking an upper opening in alignment with said cover opening.

13. An apparatus as defined in claim 12 wherein food product is dischargeable by gravity when the basket assembly is in said discharge position and the displacement means includes
a pivot shaft defining a horizontal axis
and
pivot arm means
said pivot shaft being spaced apart from the basket assembly,
said pivot arm means being fixed to the pivot shaft and to the cover means,
said displacement means being configured such that said displacement means pivots said basket assembly about said pivot shaft from the immersion position to said discharge position and pivots said basket assembly about said pivot shaft from said discharge position to said immersion position.

14. An apparatus as defined in claim 13, wherein said lock means includes
an outwardly extending peripheral flange,
  said flange being disposed about the top of the tubular member, said flange being provided with a plurality of spaced alignment apertures for engaging a lock pin, each of said alignment apertures being associated with the aligned position of a respective receptacle member, a lock pin aperture defined by said cover means and solenoid lock pin means including a retractable lock pin, said solenoid lock pin means being fixed to the cover means such that the lock pin thereof can be retractably extended through the lock pin aperture and engage an alignment aperture corresponding to the aligned position for a respective aligned respectacle member.

15. An apparatus as defined in claim 14 wherein said rotation means includes a flexible drive shaft, one end of the flexible drive shaft being operatively connected to a motor and the other end thereof being fixed to the exposed end of the spindle shaft such that the tubular member is thereby rotatably mounted to the cover plate means.

16. An apparatus as defined in claim 15 wherein the reservoir means includes a basin member having a closed bottom, an open top for receiving the carrousel container means and side wall means, said side wall means of said basin member having a circular cross-section.

17. An apparatus as defined in claim 16 wherein said apparatus includes electric heater means in the form of a helical coil disposed in the basin member adjacent to and spaced apart from the side wall means of said basin member such that for the immersion position the coil is disposed between the tubular member and said side wall means of the basin member, the coil being spaced apart from the tubular member.

18. An assembly as defined in claim 6, wherein said lock means includes an outwardly extending peripheral flange, said flange being disposed about the top of the tubular member, said flange being provided with a plurality of spaced alignment apertures for engaging a lock pin, each of said alignment apertures being associated with the aligned position of a respective receptacle member.

19. An assembly as defined in claim 18, wherein said lock means includes a lock pin aperture defined by said cover means and lock pin means including a retractable lock pin, said lock pin means being fixed to the cover means such that the lock pin thereof can be retractably extended through the lock pin aperture and lockingly engage an alignment aperture corresponding to the aligned position for a respective aligned respectacle member.

* * * * *